Nov. 2, 1971 M. E. RUCINSKI 3,616,732

APERTURE MASK OPTICAL SYSTEM

Filed Nov. 6, 1969

INVENTOR
MICHAEL E. RUCINSKI

BY Stephen & Jacobson

ATTORNEYS

United States Patent Office 3,616,732
Patented Nov. 2, 1971

3,616,732

APERTURE MASK OPTICAL SYSTEM

Michael E. Rucinski, St. Paul, Minn., assignor to Buckbee-Mears Company, St. Paul, Minn.

Filed Nov. 6, 1969, Ser. No. 874,504
Int. Cl. C23c *17/00;* B44d *1/02*
U.S. Cl. 95—1 R 6 Claims

ABSTRACT OF THE DISCLOSURE

A method for utilizing a shadow mask as a pattern for laying down a phosphorus dot pattern without affecting the physical characteristics of the mask.

BACKGROUND OF THE INVENTION

Field of the invention

This invention relates generally to fabrication or assembly of color TV picture tubes containing aperture masks and, more particularly, to the process of utilizing a lens system and aperture mask to form a phosphorus dot pattern on the face plate of a TV picture tube.

Description of the prior art

In the prior art, an operator forms sets of the three primary colored phosphorus dots on the face plate of a colored TV picture tube using the aperture mask as a layout pattern. After the phosphorus dots have been formed, the aperture mask is permanently attached in the tube to direct the electron beams onto the proper phosphorus dots. Generally, after forming the phosphorus dot pattern by using the mask as a pattern, the apertures in the mask are enlarged before permanently attaching the aperture mask to the TV picture tube. The purpose of having larger openings in the permanently attached aperture mask is that the larger openings produce a brighter picture. However, in order to have the relative location of the holes the same, it requires either enlarging the openings after using the mask as a pattern or temporarily stepping down the diameter of the openings prior to forming a phosphorus dot pattern on the face plate. Conventionally, various processes have been used for forming the three primary colored phosphorus dots on the viewing face of the tube. The construction, operation and function of the aperture mask are all disclosed and described in the prior art, for example, in an article titled "Constructing the Tri-Color Picture Tube," Electronics, p. 86, published May 1951, Pat. 3,146,368 to Fiore et al.; Pat. 2,795,719 to Morrell; Pat. 2,802,964 to Jesty; and Pat. 3,231,380 to Law. Of these prior art patents, the Law patent teaches the temporary stepping down of the apertures while the rest of the patents relate to the process of constructing, operating and functioning of the aperture mask.

Of the prior art methods, numerous processes have been employed which in one way or another alter the physical characteristics of the mask sometime before, during or after the laying down of the phosphorus dot pattern on the face plate. For example, one process involves etching the openings of the mask larger after laying the phosphorus dot pattern. Another process involves etching the holes to a larger diameter first and then electroplating material into the holes to reduce the diameter of the holes in order to lay a phosphorus dot pattern. After laying the phosphorus dot pattern, the electroplated material is etched away thus returning the openings of the mask to their original size.

The present invention overcomes the disadvantages found with these time consuming prior art processes of electroplating and etching. Some of the prior art methods are not only time consuming and therefore costly, but they oftentimes result in loss of an aperture mask because of improper etching or electroplating of the mask. This also adds to the cost of producing the aperture mask for a TV picture tube.

SUMMARY OF THE INVENTION

Briefly, the present invention comprises forming an optical lens system within the mask to converge the light beams as they pass through the aperture mask and onto the sensitized phosphorus screen. Because of the convergence of the light beam, it exposes a smaller area of phosphorus than the open area of the apertures. Thus, there is no need to alter the hole size of the mask once the mask has been formed.

DESCRIPTION OF THE PREFERRED EMBODIMENT

Figure 1:
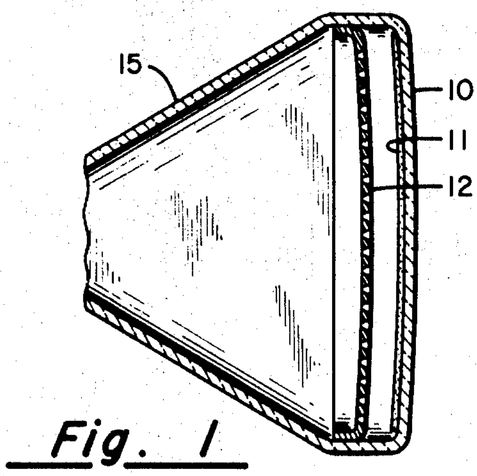
FIG. 1 is a somewhat functional partial cross-sectional view of the forward part of a color TV picture tube which has been greatly simplified to illustrate the arrangement of the aperture mask and the phosphorus screen.

FIG. 1 shows a typical conventional color TV aperture mask and picture tube which has a glass plate or viewing face 10 that is coated on the inside surface with a layer of phosphorus dots 11 representing the three primary colors. In FIG. 1 the phosphorus dots are represented as a uniform layer 11 for simplicity. Located within the tube envelope 15 and between electron guns (not shown) and the phosphorus layer 11 is an aperture mask 12 which is ordinarily made out of a sheet of metal, such as cold rolled steel. The mask contains a myriad of miniature openings or apertures through which electron beams pass before striking phosphorus layer 11. Other component parts of the picture tube such as shields, deflecting plates, mounting means for the aperture mask, etc. have been deleted to simplify the drawings, as they do not constitute an essential part of the invention, nor are they necessary to fully describe the present invention.

Processes used to form the phosphorus layer 11 on the face plate 10 are well known in the prior art. One such process is shown and described in greater detail in Kaplan U.S. Pat. 2,959,483. Briefly, a typical prior art process comprises initially coating the inside surface of face plate 10 with a first primary color phosphorus in a sensitized carrier and then exposing the coating to a suitable source of energy, such as light, through the aperture mask. When light strikes the phosphorus layer, it hardens the area exposed to the light. After exposure the unhardened areas are then washed away and removed. Next an operator applies a layer of a second primary color phosphorus in a suitable sensitized carrier and exposes the second layer to an energy source through the aperture mask. To prevent the exposed areas from falling on top of one another, the operator shifts either the light beam from the energy source or the mask so that the newly exposed areas are slightly displaced from the areas exposed earlier. The unhardened areas of the second layer of phosphor are then washed away and removed. This process can be repeated till there are as few as three sets or as many as six sets of phosphorus dots. By this process there are formed sets of elemental areas containing the three discrete primary color phosphor dots. It is quite critical that each of these discrete dots be precisely located with respect to one another within the set and that each set be precisely located with respect to the other sets. Because of minute almost imperceptible differences that may exist between aperture masks, it is best and virtually mandatory, with the present state of the art, that the same mask be used to form each of the three color dots and that the same mask be permanently assembled in the picture tube for the operational function of guiding the electron beams onto the respective phosphor dots.

Figure 2:
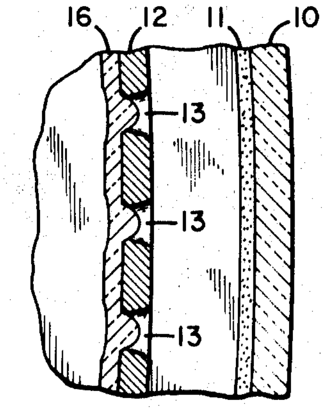
FIG. 2 is an enlarged, partial cross-section view illustrating the lens system of the particular invention.

Referring to FIG. 2, face mask 12 is shown in position with respect to phosphor screen 11. The process of making and forming aperture mask 12 is well known in the art and hence will not be described herein.

Figure 3:
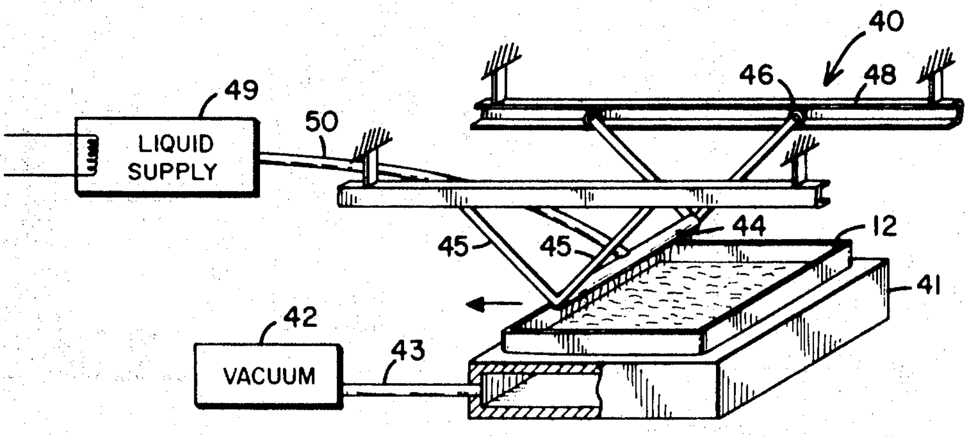
FIG. 3 shows apparatus for forming a lens system for the present invention.

After the mask has been formed, an operator forms a number of lenses by applying a layer of transparent material over the back side of the mask through suitable apparatus such as shown in FIG. 3. Briefly, the layer of transparent material is continuous and contains curved projections which extend into the apertures of the mask to produce localized sections having a convex front portion and a slightly concave rear portion. The transparent material 16 may comprise a continuously formed sheet of polyethylene. However, no limitation is intended thereto. Typically, an operator applies the polyethylene in a liquid state and allows it to cool onto the mask to form the lens-like arrangement in each aperture mask to thereby provide a system for optically reducing an image projected onto the phosphor screen.

Referring to the drawing, FIG. 3 shows liquid coating apparatus 40 for applying a thin layer of transparent material on the back side of mask 12. Typically, mask 12 is supported over a vacuum table 41 that connects to vacuum pump 42 through a conduit 43. Located above mask 12 is a movable applicator arm 44 that is supported by end supports 45 that have rollers 46 located on the ends thereof. Rollers 46 form rolling engagement with rails 48. The applicator is driven by suitable means (not shown) from one end of mask 12 to the other end of mask 12 as liquid material flows from liquid supply 49 through conduit 50. The liquid flows on to the mask and quickly cools to the desired shape to produce a lens in each aperture opening.

By controlling the temperature of the liquid material, the viscosity and the differential pressure across the face of the mask can control the shape and hence the focal length of the lens. Typically, the higher the temperature of the material, the viscosity of the material and the differential pressure across the face of the mask, the more the liquid material flows into the aperture of the mask and hence the greater the convergence of the lens. Conversely, by either cooling the liquid or reducing the differential pressure across the face of the mask, it causes the liquid to solidify before it can flow very far into the aperture and hence this decreases the convergence of the lens.

Figure 4:
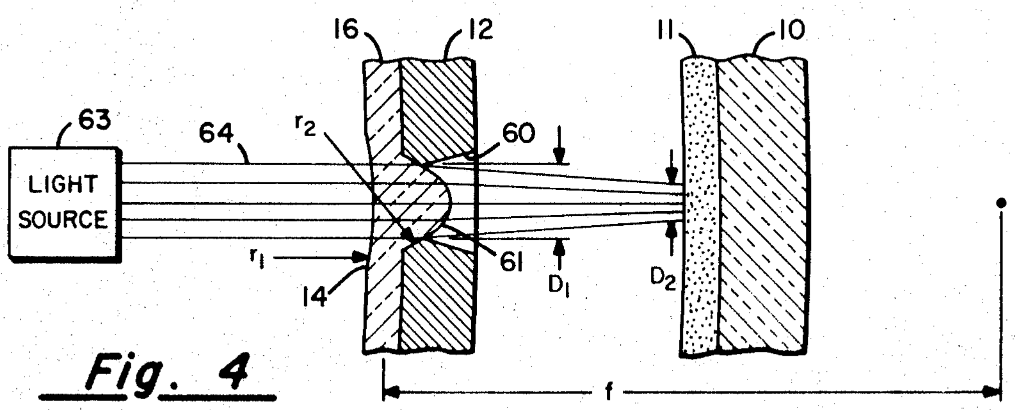
FIG. 4 shows the optical lens system converging a light beam so as to produce a smaller image on a sensitized phosphorus screen.

FIG. 4 shows in semischematic form a greatly enlarged aperture lens system for forming phosphor dots on phosphor screen 11. Located partially within aperture 60 is a concavoconvex lens 61 having a first radius of curvature designated by $r_1$ for the concave portion of the lens and a radius of curvature designated by $r_2$ for the convex portion of the lens. The focal length of lens 61 is designated by $f$. Located halfway between mask 12 and the focal point of the lens is sensitized phosphor screen 11. Phosphor screen 11 as previously mentioned, contains material that when exposed to light hardens to form a suitably colored phosphor dot.

Located behind lens 61 is a uniform light source 63 that is shown emitting parallel light rays 64. Light ray 64 travels in a parallel path until they enter lens 61. Upon entering lens 61 the light rays are deflected inward so as to produce convergence of the light rays at the focal point $f$. However, by placing phosphor screen 11 between lens 61 and the focal point, it intercepts the light rays before they are completely converged. The diameter of open area of aperture 61 is designated by $D_1$ and the diameter of the projected area of the light rays is designated by $D_2$. Typically, it is preferred to have the diameter of the projected area or phosphor dot approximately half the diameter $D_1$ of the open area of aperture 61. With this relative relation between $D_1$ and $D_2$ one obtains the maximum possible brightness of the color TV picture. After the suitable phosphor dots have been formed on face plate 10, the transparent material 16 which contains lens 61 is peeled from the back of mask 12. Mask 12 is then permanently mounted in the picture tube to direct the electron beams onto the proper phosphor dots.

I claim:

1. A preformed shadow mask for use in manufacturing a colored picture tube comprising: a curved metallic surface having a plurality of apertures arranged in a predetermined pattern; and a sheet of meltable transparent material solidified over the concave side of said surface, said sheet of transparent material forming a plurality of solidified lens shaped droplets in each aperture therein to thereby optically control the size of images projectible through said plurality of apertures.

2. A shadow mask in accordance with claim 1 wherein said curved metallic surface comprises a dome shaped mask for mounting in a television tube.

3. A shadow mask in accordance with claim 1 wherein said meltable transparent material comprises a sheet of flexible plastic material.

4. The invention as described in claim 1 wherein said plurality of solidified lens shaped droplets harden into a plurality of converging lens shapes.

5. The invention as described in claim 4 wherein said converging lens shapes are concavoconvex.

6. The invention as described in claim 5 wherein the convex portion of said lens extends into said apertures of said mask.

References Cited

UNITED STATES PATENTS

| | | | |
|---|---|---|---|
| 3,188,516 | 6/1965 | De France et al. | 313—85 X |
| 3,268,753 | 8/1966 | Hughes | 313—85 X |

ALFRED L. LEAVITT, Primary Examiner

E. G. WHITBY, Assistant Examiner

U.S. Cl. X.R.

117—33.3, 37 R, 132 R; 313—85 R, 92 B; 96—36.1